United States Patent

[11] 3,584,902

| [72] | Inventor | Gerrard N. Vyse |
| | | Garden City, Mich. |
| [21] | Appl. No. | 840,421 |
| [22] | Filed | July 9, 1969 |
| [45] | Patented | June 15, 1971 |
| [73] | Assignee | Anchor Coupling Co., Inc. |
| | | Libertyville, Ill. |

[54] QUICK-CONNECT SAFETY COUPLING
2 Claims, 4 Drawing Figs.

[52] U.S. Cl. .................................................. 285/305,
285/351
[51] Int. Cl. ................................................. F16l 37/00
[50] Field of Search ........................................... 85/8-8;
287/135; 137/583; 285/305, 315, 316, 321, 351,
151, 82, 84, 86, 276, 277

[56] References Cited
UNITED STATES PATENTS

| 2,021,241 | 11/1935 | Mall | 85/8.8X |
| 3,314,696 | 4/1967 | Ferguson et al. | 285/321X |
| 3,352,576 | 11/1967 | Thomsen | 285/321X |
| 3,453,005 | 7/1969 | Foults | 285/321X |

FOREIGN PATENTS

| 1,158,329 | 11/1963 | Germany | 285/277 |

*Primary Examiner*—Dave W. Arola
*Attorney*—Johnston, Root, O'Keeffe, Keil, Thompson & Shurtleff ABSTRACT: A quick-connect safety coupling is provided which is intended to be used as a means of connecting hose assemblies and tubing in fluid (liquid and/or gas) systems without the use of screw threads or other complex components, said coupling being characterized by a safety feature which permits the coupling components to be partially disengaged with gradual release of pressure and without flying apart due to internal pressure. The coupling consists of a male member and a female member with one or more O-ring seals between them, an upset portion on the male member providing a shoulder or abutment, a plurality of transverse slots spaced longitudinally in the female member, and resilient retaining clips in the slots one of which clips abuts against said shoulder and another of said clips being spaced longitudinally and preferably shielded so that it cannot be removed readily, whereby when the first named clip is removed the two members can be partially separated or uncoupled with respect to one another so as to permit gradual relief of the internal pressure in the system, after which the other retaining clip or clips can be removed and the two members entirely separated or uncoupled.

PATENTED JUN 15 1971 3,584,902
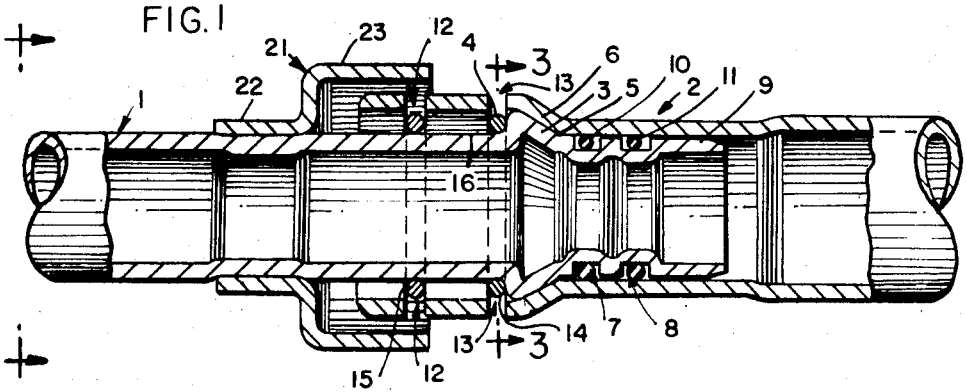
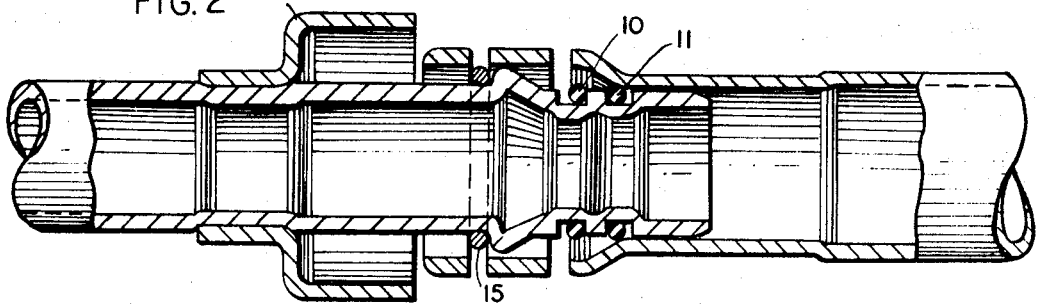
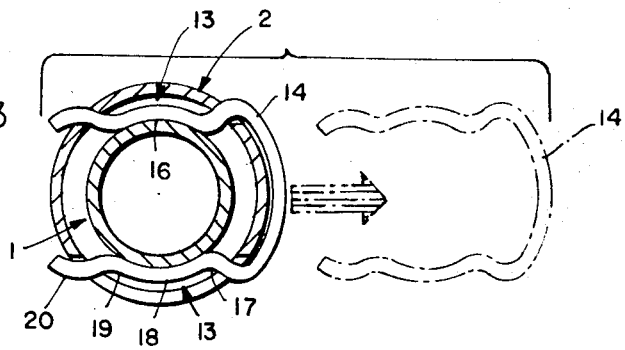
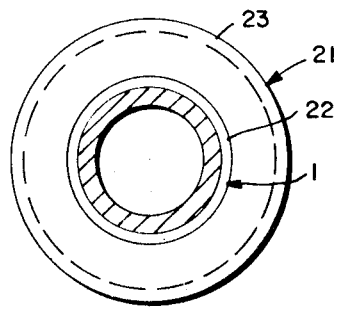
INVENTOR:
GERRARD N. VYSE
BY
Johnston, Root, O'Keeffe, Keil, Thompson & Shurtleff
ATT'YS

QUICK-CONNECT SAFETY COUPLING

PRIOR ART

Attempts have heretofore been made to provide quick-connect couplings for connecting hose assemblies and tubular conduits. Illustrations of various devices that have heretofore been proposed are given in U.S. Pat. Nos. 763,837, 3,084,713, 3,124,157, 3,124,374, 3,234,965, 3,314,696 and 3,336,944.

OBJECTS OF THIS INVENTION

One of the objects of this invention is to provide a new and improved quick-connect safety coupling which is intended to be used as a means of connecting hose assemblies and tubing in fluid (liquid and/or gas) systems without the use of screw threads or other complex components.

Another object of the invention is to provide a new and improved coupling of the type described which has safety features permitting the coupling components to be partially disengaged with gradual release of pressure and without flying apart due to internal pressure.

Another object of the invention is to provide a new and improved quick-connect safety coupling which is especially useful on automotive air conditioning systems and other systems in which a substantial internal pressure exists which presents a problem when the coupling is disconnected.

BRIEF SUMMARY OF THE INVENTION

In accordance with the invention a safety coupling for use in hose assemblies and tubing is provided which comprises:
  a. a tubular male member having an outwardly extending bead or shoulder providing an abutment having a substantially vertical surface;
  b. a tubular female member having a plurality of transverse slots spaced longitudinally therein, one of which is adjacent said vertical surface of said abutment of (a) when (a) and (b) are fully coupled;
  c. a retaining member disposed in one of said slots of (b) which abuts against said vertical surface of said shoulder of (a) when (a) and (b) are fully coupled;
  d. a second retaining member disposed in another of said slots of (b) which does not abut against said surface of said shoulder of (a) when (a) and (b) are fully coupled; and
  e. sealing means disposed between (a) and (b) adapted to permit coupling and uncoupling of (a) and (b).

In addition to the foregoing essential features of the invention, another important feature is the provision of means for preventing the removal of the retaining member (d) without first removing retaining member (c) when (a) and (b) are fully coupled. This means is preferably in the form of a shield over one of the slots of the member (b) normally occupied in the fully coupled position by member (d), said shield normally preventing removal of retaining member (d) from said slot when (a) and (b) are fully coupled.

The retaining members (c) and (d) are preferably resilient clips which can be made from resilient spring metal or other suitable materials such as, for example, organic polymers or copolymers having the necessary strength and resiliency.

The sealing means preferably comprises at least two O-rings seated in spaced grooves in the coupling portion of member (a) and so arranged that the seal can be broken by removing retaining member (c) and partially uncoupling members (a) and (b) until member (d) abuts against said shoulder of member (a) in the position normally occupied when fully coupled by member (c). The O-rings can be made of any suitable material which has the necessary resiliency and chemical resistance to fluids being used in the system as, for example, rubber, synthetic rubber, and synthetic polymers or copolymers.

Other objects and advantages of the invention will appear from the following description in conjunction with the accompanying drawing in which:

FIG. 1 is a cross-sectional view taken longitudinally of a coupling provided in accordance with the invention;

FIG. 2 is a cross-sectional view taken longitudinally of the coupling shown in FIG. 1 in a partially uncoupled position;

FIG. 3 is a cross-sectional view taken along the line 3,3 of FIG. 1 showing in dotted lines the manner in which the retaining clips are removed as hereinafter described; and FIG. 4 is an end view of the coupling shown in FIG. 1.

DETAILED DESCRIPTION OF THE INVENTION

As shown in the drawings, each fitting or coupling consists of a male half generally indicated at 1 and a female half generally indicated at 2. The male half is preferably fabricated from a tube made of metal or other suitable material by upsetting an intermediate portion to form a bead or shoulder 3 having a substantially vertical face 4 and a sloping face 5 which slopes upwardly and rearwardly and provides both a cam surface for retaining clips during coupling and a contacting surface for the outwardly sloping portion 6 of the female member 2 in the coupled position. A plurality of annular grooves 7 and 8 are formed adjacent the coupling end 9 of the male member 1 and are adapted to receive O-rings 10 and 11. The grooves 7 and 8 can be made by rolling the tube and displacing a predetermined amount of the material from which the tube is formed or they can be made in any other suitable manner.

The female coupling member is provided with two pairs of longitudinally spaced slots 12,12 and 13,13 which are adapted to receive retaining clips 14 and 15 made from spring metal or other suitable material.

The O-ring end of the male half of the coupling is sized to fit the inside diameter of the female half of the coupling with a clearance of approximately 0.005 inch.

The female half of the coupling 2 is expanded at the end to fit over the maximum upset diameter on the male half and is sized to insure an adequate seal. An alternative method of making the female half is to machine it from solid or tubular stock in a manner to accept the maximum upset diameter and fit the male half to insure an adequate seal.

As shown in FIG. 3, the slots which are provided in the female half of the coupling to allow installation and removal of the retaining clips extend inwardly until they are tangential or in some cases slightly above or below the surface 16 of the male member 1. The retaining clips 14 and 15 in the embodiment illustrated in the drawings are made of spring wire and are generally U-shaped with the opposing legs of the U being bent inwardly at point 17, then outwardly at point 18, inwardly again at point 19 and outwardly at point 20, thereby providing an outwardly convex area between points 17 and 19 and again adjacent the end of each clip. The convex area at point 18 permits each clip to contact and partially encircle the outer surface of the male member 1. The convex portion at 20 permits each clip to contact the bottom of each of the slots 12 and 13 in the female member 2. Thus when the male member 1 and the female member 2 are assembled with the clips in coupled position, the two members are held together against longitudinal movement with respect to one another. Normally they are capable of rotational movement with respect to one another. This permits the member bearing the retaining clips to be moved to a position where these clips can be removed when so desired.

One of the problems encountered in fluid systems, especially in gas systems or systems containing both liquids and gases, is a tendency of the coupling members to fly apart when it is desired to uncouple them. In accordance with the present invention a safety feature is provided in the form of a shield 21 made of metal or other suitable material which is welded or otherwise fastened to the male member 1. This is accomplished by forming a shield with a collar 22 and an enlarged shield portion 23. The shield portion 23 surrounds a portion of the male member 1 and overlies the slots 12,12 when members 1 and 2 are coupled.

In order to assemble the coupling the retaining clips 14 and 15 are snapped into position in the slots 13,13 and 12,12 of the female member 2. The O-rings 10 and 11 are also placed in the grooves 7 and 8 of the male member 1. The coupling end 9 of the male member 1 is then inserted into the expanded end of the female member 2 and the two members are pressed together, thereby causing the retaining clips 15 and 14 to be cammed upwardly over the cam surface 5 and past the vertical face 4 of the bead or shoulder 3 until the retaining clip 15 is beneath the shield portion 23 of shield 21 and the retaining clip 14 is seated against vertical face 4 of shoulder 3. At the same time, the outwardly sloping portion 6 of the female member 2 will be seated against the sloping portion 5 of male member 1. At this point the two coupling members are securely locked together and the desired connection has been completed. It is no longer possible to remove the retaining clip 15 without first removing retaining clip 14.

In order to uncouple or disconnect the members 1 and 2, retaining clip 14 is pulled outwardly by means of pliers or other suitable instrument in the manner shown by the dotted line position in FIG. 3. The members 1 and 2 can then be moved to the partially uncoupled position shown in FIG. 2. In this position the retaining clip 15 still holds the two coupling members together but they have been uncoupled to the extent that the O-rings 10 and 11 no longer act as a complete seal but rather permit the gradual release of internal pressure. In other words, the connection now leaks slowly but the internal pressure will not blow the male half completely out of the female half. When the leak stops, retaining clip 15 may be removed in order to complete the uncoupling.

The invention provides quick-connect fittings which can be manufactured quite simply from tubular material by upsetting a contour bead or shoulder and roll forming the O-ring grooves on the male member and by expanding and cutting slots in the female member. The invention also provides a safety shield and a means for relieving the internal pressure of a fluid system without entirely separating the two coupling members and thereby avoiding one of the major problems encountered in the use of coupling members in pressure systems, namely, the tendency of the coupling members to fly apart due to the internal pressure. Coupling members of the type herein described are especially useful in automotive air-conditioning systems and other types of systems where it is necessary to connect and disconnect fittings quickly and with safety.

I claim:

1. A safety coupling unit for use in hose assemblies and tubing, said coupling unit comprising a tubular male member having an outwardly extending shoulder providing an abutment having a substantially vertical surface, a tubular female member having a plurality of transverse slots spaced longitudinally therein one of which is adjacent said surface of said abutment of said male member when said male and female members are fully coupled, a first retaining clip disposed in said one of said slots of said female member which abuts against said surface of said shoulder of said male member when said male and female members are fully coupled, a second retaining clip disposed in another of said slots of said female member which does not abut against said surface of said shoulder of said male member when said male and female members are fully coupled, a shield fixed on said male member against relative motion thereto and covering said second retaining clip preventing the removal of said second retaining clip but not said first retaining clip when said male and female members are fully coupled, and sealing means disposed between said male and female members, said sealing means being adapted to permit coupling and uncoupling of said male and female members and positioned to permit venting when said first retaining clip is removed and said members are partially uncoupled to a point where said second retaining clip abuts against said surface of said shoulder.

2. A coupling as claimed in claim 1 in which said sealing means comprise O-rings seated in spaced grooves in the coupling portion of said male member.